Patent Text

3,037,010
POLYMERIC PERFLUORO-2-BUTYNE
John Ferguson Harris, Jr., Wilmington, Del., assignor to E. I. du Pont de Nemours and Company, Wilmington, Del., a corporation of Delaware
No Drawing. Filed Nov. 27, 1957, Ser. No. 699,184
2 Claims. (Cl. 260—92.1)

This invention relates to new fluorine-containing polymers and to their preparation.

The discovery of polytetrafluoroethylene with its remarkable properties, particularly its high melting point, thermal stability, and chemical inertness, has given great impetus to the chemistry of the polyfluorinated unsaturated organic compounds. The fluorinated alkenes and alkanes have been studied extensively and much has been learned of the effect of the fluorine function in these compounds. Comparatively little, however, has been done with the fluorinated alkynes.

In accordance with the present invention, it has now been discovered that useful pressure-coalescible polymers which are essentially insoluble and infusible can be prepared by subjecting bis-perfluoro-2-butyne to high energy radiation. These polymers are further characterized by being stable at temperatures of at least 450° C., resistant to boiling nitric acid, and pressure-coalescible.

The polymers of this invention are obtained by exposing the bis-perfluoro-2-butyne to ionizing radiation having an energy of at least 50 electron volts.

It is recognized that the energy characteristics of one form of ionizing radiation can be expressed in terms which are appropriate for another form. Thus, one may express the energy of either the particles of radiation commonly considered as particle radiation or of the photons of radiation commonly considered as wave or electromagnetic radiation in electron volts (ev.) or million electron volts (mev.). In the irradiation process of this invention, radiation consisting of particles or photons having an energy of 0.1 mev. and over is preferred. With radiation of this type, polymerization of the bis-perfluoro-2-butyne can be obtained with a minimum length of exposure to the radiation. Particles or photons with an energy equivalent of 0.5–4 mev. are the most useful from a practical standpoint. Radiation with higher energies (i.e., 10 mev. and higher) may also be employed.

A minimum exposure of at least 0.01 watt-sec./cm.$^2$ at the surface is necessary since lower degrees of exposure do not give practical quantities of product. Exposures as high as 10,000 to 100,000 watt-sec./cm.$^2$ may be employed. The exposure may be carried out in one slow pass, or in several faster ones and may be conducted at any convenient rate of energy input.

Suitable ionizing radiations for use in this invention include both radiation in the form sometimes regarded as particle radiation and radiation in the form sometimes regarded as ionizing electromagnetic radiation.

By particle radiation is meant an emission of accelerated electrons or nuclear particles such as protons, neutrons, $\alpha$-particles, deuterons, $\beta$-particles, or the like, so that the said particle impinges upon the bis-perfluoro-2-butyne. The charged particles may be accelerated by means of a suitable voltage gradient, using such devices as a cathode ray tube, resonant cavity accelerator, a Van de Graaff accelerator, a Cockcroft-Walton accelerator, or the like, as is well known to those skilled in the art. Neutron radiation may be produced by suitable nuclear reactions, e.g., bombardment of a beryllium target with deuterons or $\alpha$-particles. In addition particle radiation suitable for carrying out the process of the invention may be obtained from an atomic pile, or from radioactive isotopes or from other natural or artificial radioactive materials.

By ionizing electromagnetic radiation is meant radiation of the type produced when a metal target (e.g., tungsten) is bombarded by electrons possessing appropriate energy. Such radiation is conventionally termed X-ray. In addition to X-rays produced as indicated above, ionizing electromagnetic radiation suitable for carrying out the process of the invention may be obtained from a nuclear reaction ("pile") or from natural or artificial radioactive material. In all of these latter cases the radiation is conventionally termed "gamma rays."

The bis-perfluoro-2-butyne from which the polymers of this invention are made may be prepared by the method disclosed in U.S. Patent 2,546,997, issued April 3, 1951, to C. I. Glouchener.

The example which follows illustrates the above method for preparing the polymers of this invention:

A rectangular aluminum dish, 11.3 cm. x 5.6 cm. x 4.4 cm., cooled in an acetone-solid carbon dioxide mixture, and covered with a polyethylene terephthalate film, was charged with 25 g. of perfluoro-2-butyne. The charged reactor was then exposed to four passes, each of 1.1 seconds' duration, under a 500 watt beam of 2 mev. electrons from a Van de Graaff generator. The absorption of electronic energy by the perfluoro-2-butyne during this time was about 965 watt-sec. After the distillation of the unpolymerized perfluoro-2-butyne, there was obtained 6.0 g. of a white, opaque, rather brittle, porous polymer in one piece, 0.23 cm. thick.

Examination of transparent films of this polymer show strong absorption bands in the region of 240 mu. This is indicative that the polymer has as the unit structure the grouping

The polymer produced as above is extremely resistant to oxidation and shows remarkable thermal stability. Thus, refluxing for three days in concentrated nitric acid brings about only a 0.7% weight loss and heat treatment at 260° C. at 0.1 mm pressure for three days causes a weight loss of 0.7%. At 465° to 475° C. and atmospheric pressure the weight loss in three hours is 31%. In contrast to this figure a high molecular weight polytetrafluoroethylene loses 66% in weight under the same conditions.

The above polymer when subjected to pressures of the order of 50,000 lb./sq. in. at ordinary room temperature (ca. 22° C.) in a die yields chips which have the shape of the die and which are hard and transparent.

Films from the above polymer which are clear are obtained by pressing at 20,000 lbs./sq. in. at ordinary room temperature (ca. 22° C.). These films, because of their transparency, combined with exceptional oxidative resistance and thermal stability, are useful as windows for high temperature equipment.

Although in the example the polymerization has been carried out in the absence of a reaction medium, it is to be understood that polymerization can be effected in the presence of an inert liquid medium. Suitable media are hydrocarbons, especially fluorinated hydrocarbons, such as perfluorodimethylcyclohexane, perfluorodimethylcyclobutane, etc.

The amount of reaction medium is not critical. A convenient amount will be about 1 to 1 weight ratio.

The polymers of this invention are insoluble in the common organic solvent and when heated at temperatures at which they begin to decompose show no evidence of melting. As indicated in the example, however, they can be coalesced and shaped into useful articles.

The outstanding resistance to oxidation and exceptional thermal stability of the polyperfluoroalkylacetylenes of this invention makes them uniquely useful in all applications where products possessing such properties are known to be useful, namely, as coatings for surfaces which are in contact with corrosive liquids, such as acids and bases, as high temperature electrical insulation, etc.

I claim:

1. A pressure coalescible solid homopolymer of perfluoro-2-butyne, said polymer being stable at a temperature of 450° C. and not meltable without decomposition.
2. The product of claim 1 in film form.

References Cited in the file of this patent

UNITED STATES PATENTS

| | | |
|---|---|---|
| 2,350,330 | Remy | June 6, 1944 |
| 2,546,997 | Gochenour | Apr. 3, 1951 |
| 2,593,583 | Lontz | Apr. 22, 1952 |
| 2,705,229 | Ruh et al. | Mar. 29, 1955 |
| 2,729,613 | Miller | Jan. 3, 1956 |
| 2,750,431 | Tarrant et al. | June 12, 1956 |
| 2,763,609 | Lewis et al. | Sept. 18, 1956 |
| 2,966,482 | Bolstad et al. | Dec. 27, 1960 |